June 21, 1960

F. R. WILHELM ET AL 2,941,411

BELT CONVEYOR

Filed July 30, 1958

INVENTORS
FRED R. WILHELM AND
HENRY L. MEYER

BY Bates, Teare & McBean
ATTORNEYS

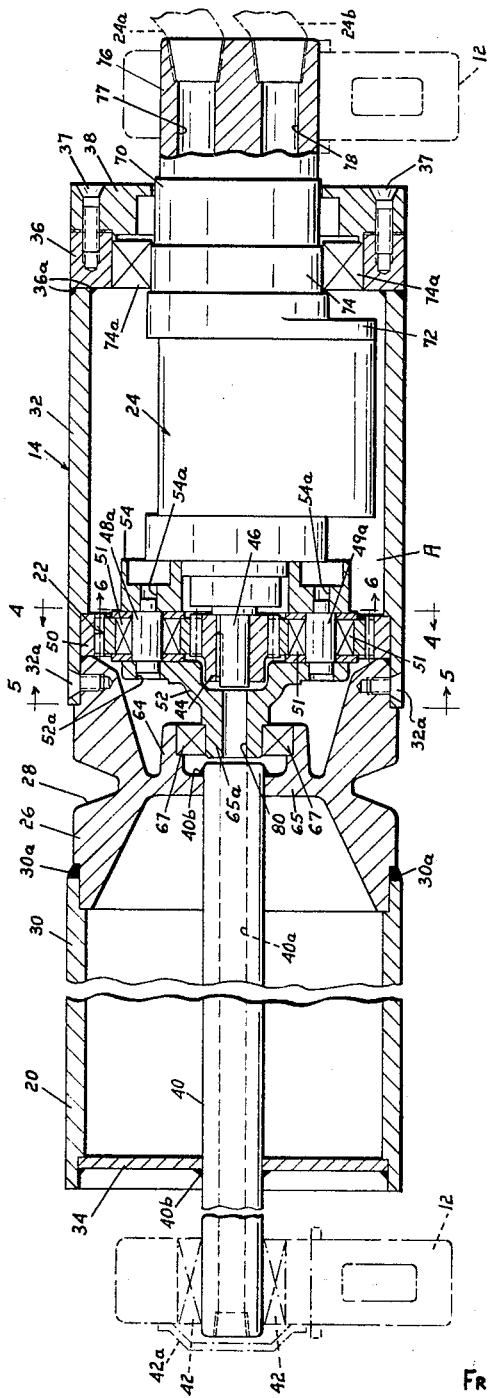

June 21, 1960    F. R. WILHELM ET AL    2,941,411
BELT CONVEYOR
Filed July 30, 1958    3 Sheets-Sheet 3

INVENTORS
FRED R. WILHELM AND
BY HENRY L. MEYER
Bates, Teare + McBean
ATTORNEYS

United States Patent Office 2,941,411
Patented June 21, 1960

2,941,411
BELT CONVEYOR

Fred R. Wilhelm, Willowick, and Henry L. Meyer, Cleveland Heights, Ohio, assignors to The Cleveland Trencher Company, Cleveland, Ohio, a corporation of Ohio Filed July 30, 1958, Ser. No. 752,024

5 Claims. (Cl. 74—230.01)

This invention relates in general to belt conveyors and more particularly to a motorized drive pulley for belt conveyor mechanism.

The motorized drive pulley of the instant invention is particularly well adapted for use on conveyor mechanisms used in connection with excavating or trenching machines, although it may be advantageously used with conveyors in other environmental settings.

Conveyor mechanisms for use with the above-mentioned excavating or trenching machines are generally driven by means of endless chains and associated sprockets, suitably geared to a source of power, such as the main power plant of the machine. An example of such an arrangement is that shown in United States Patent No. 2,598,339, issued May 27, 1952 to Albert R. Askue. Such driving mechanisms are not only bulky, thus occupying a material amount of valuable space in the excavating mechanism, but are relatively easily subject to injury, and require considerable attention to maintain the workability of the same.

The present invention provides a powered pulley mechanism for belt conveyors which embodies a preferably hydraulic motor unit integrally combined with the pulley, for driving the latter, thus providing a self-contained motorized pulley unit for effectively moving the associated belt of the conveyor mechanism.

Accordingly, an object of the invention is to provide a belt conveyor mechanism having a motorized drive pulley unit for moving the belt of the conveyor mechanism.

Another object of the invention is to provide a pulley unit of the latter category which includes a hydraulic, rotary type motor unit integrally associated therewith, for driving the pulley.

A further object of the invention is to provide a motorized drive pulley unit which is sufficiently rugged in construction for employment with belt conveyor mechanisms of the type used with excavating machines, and which is sufficiently compact for use in existing designs of such conveyor mechanism.

A more specific object of the invention is to provide a motorized drive pulley for a belt conveyor comprising a hollow, rotatable shell or housing member with a gear reduction unit and a hydraulic motor unit mounted in the interior of the housing member for driving the latter, and wherein the pulley construction is such that it may be readily disassembled and/or assembled for expeditious maintenance and repair thereof.

Other features and advantages of the invention will be apparent from a consideration from the following description taken in conjunction with the accompanying drawings wherein:

Fig. 2 is a vertical, sectional view taken generally along the plane of line 2—2 of Fig. 1, looking in the direction of the arrows, the conveyor belt element having been removed in the interests of simplicity;

Figure 1:
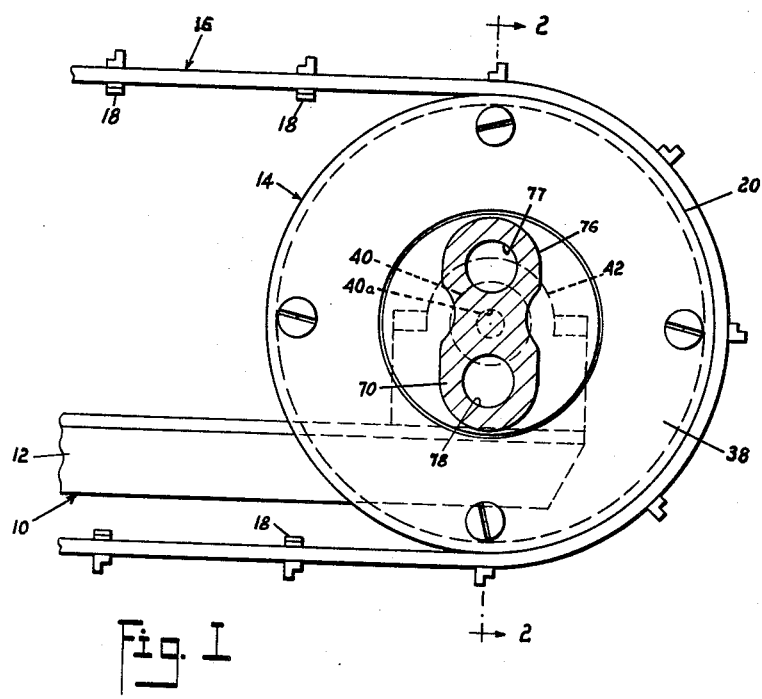
Fig. 1 is a fragmentary, partially sectioned, side elevational view of one end of a belt conveyor embodying a motorized drive pulley of the type of the instant invention.

Referring now again to the drawings, there is shown a belt conveyor mechanism 10 generally comprising a frame structure 12, a motorized head pulley unit 14 of the type of the instant invention, and an endless belt 16 made of rubber, fabric or other flexible material and carried by pulley unit 14. It will be understood, of course, that only a fragmentary portion of the conveyor mechanism is shown in the drawings and that such conveyor mechanism may include one or more other motorized pulley units of the type of the instant invention, together with conventionally used conveyor idler units.

In the embodiment illustrated, conveyor belt 16 includes lugs 18 projecting from the underside thereof, which are adapted to coact with the pulley unit in a manner to be hereinafter discussed, for aiding in aligning the belt in a direction transverse with respect to the pulley unit.

The pulley unit 14, in general, comprises a rotatable, cylindrical like shell or housing member 20, an internal gear reduction unit, generally referred to by reference number 22, and a hydraulic motor unit 24, mounted interiorly of the housing or shell 20 and connected by feed lines 24a and 24b and valve mechanism (not shown), of conventional type, to an external source of pressurized fluid. Such a source of working fluid may comprise a pump mounted on the associated excavating machine and operatively connected to the main motor unit thereof in a manner well known in the art.

Housing 20 includes central guide sheave element 26 (Fig. 2) having a circumferentially extending groove 28 therein for receiving the aforementioned lugs 18 on the belt 16 in complementary guiding relation, to aid in transverse alignment of the belt with respect to the pulley unit. The latter guiding arrangement is known in the art, as for instance in Patent No. 2,375,065, issued May 1, 1945 to Albert R. Askue, and accordingly will not be described in greater detail here. The remainder of housing 20 comprises a generally cylindrical shell section 30, which in the embodiment illustrated is welded as at 30a to guide sheave element 26, and another cylindrical shell section 32, which is attached as by means of removable fastener elements 32a, to the other end of the guide sheave 26. The outer end of shell section 30 is closed by end wall 34 while the outer end of shell or housing section 32 comprises shoulder ring member 36 which is secured, as by means of welds 36a to housing section 32. Secured to shoulder element 36 as by means of fastening elements 37, is an end cap member 38. A stub shaft 40 having an axial passageway 40a extending completely therethrough is provided, on one end of the pulley unit, with the shaft being secured, as by means of welds 40b to housing 20. The external end of shaft 40 is suitably mounted, as by means of conventional bearing mechanism 42, to the associated conveyor frame structure 12. A cap 42a is preferably provided, for covering the bearings 42 and the opening 40a in the support shaft 40.

Figure 4:
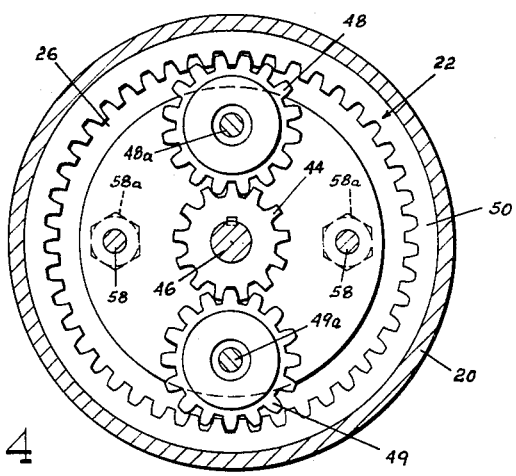
Fig. 4 is an enlarged, vertical sectional view taken generally along the plane of line 4—4 of Fig. 2; looking in the direction of the arrows.
Figure 5:
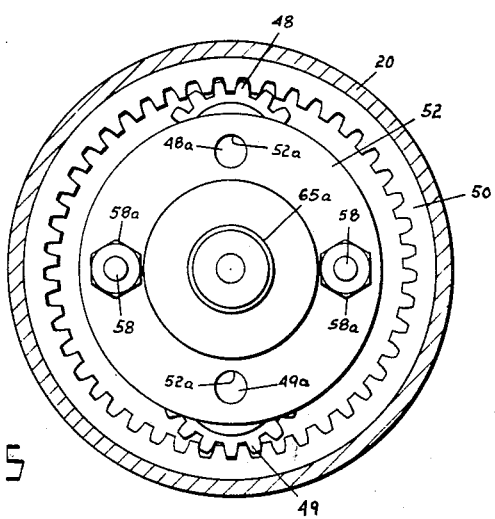
Fig. 5 is an enlarged, vertical sectional view taken substantially along the plane of line 5—5 of Fig. 2, looking in the direction of the arrows.
Figure 6:
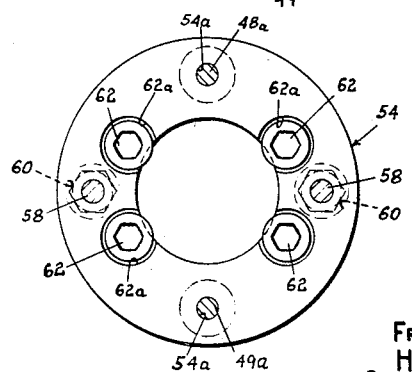
Fig. 6 is an end elevational view of a component part of the motorized pulley mechanism, taken generally along the plane of line 6—6 of Fig. 2, looking in the direction of the arrows.

The aforementioned gear reduction unit 22 broadly comprises a central or sun gear element 44 (Figs. 2 and 4) keyed to the power shaft 46 of hydraulic motor unit 24, a pair of planetary-like or intermediate gear elements 48 and 49, rotatably mounted on fixed axle members 48a and 49a respectively, and an internal ring gear 50 secured by any suitable means to the interior periphery of housing 20. Intermediate gear elements 48 and 49 are rotatably mounted on their associated shaft members 48a and 49a respectively by bearing assemblies 51 of conventional type. Gear elements 48 and 49, and their associated fixed axles 48a and 49a, are mounted in housing 20 by means of a spider member 52 (Figs. 2 and 5) and an adaptor plate member 54 (Figs. 2 and 6) which support opposite ends of the axle shaft elements 48a and 49a, the latter being received in openings 52a and 54a in the spider member and the plate member respectively. Spider member 52 and adaptor plate 54 are secured to one another by any suitable means, as for instance the lengthwise extending bolt and nut fastener elements 58 and 58a illustrated (Figs. 5 and 6). Suitable openings are provided through members 52 and 54 for receiving the bolt shanks, and recessed or countersunk portions 60 are provided in plate member 54 for receiving the heads of such bolt means in generally flush relation. Plate member 54 is secured by means of bolts or cap screws 62 to the adjacent hydraulic motor unit 24 for supporting one end of the latter in stationary condition in housing 20. Countersunk portions 62a are provided in element 54 for receiving the heads of bolts 62 in generally flush relation. A laterally projecting support portion 64 (Fig. 2) is provided on web 65 of guide sheave 26 for supporting the free cylindrical end 65a of spider element 52. Bearing elements 67 of conventional type are provided for anti-frictional mounting of the movable guide sheave 26 and associated housing sections 30 and 32 with respect to the stationary gear reduction structure 22.

It will be seen therefore that with the latter arrangement, the sun gear 44 rotates upon actuation of hydraulic motor unit 24, thereby rotating intermediate gear elements 48 and 49 about their fixed axes 48a and 49a, thereby rotating ring gear 50, and thus driving the housing member 20 of the puley unit.

Motor 24 is of conventional type, well known in the art, and preferably is so arranged so as to be reversibly driven, thereby providing for the driving of the conveyor belt 16 in opposite directions. The motor is also preferably of the high speed type, and is provided at its outer or right hand end (as viewed in Fig. 2) with an adaptor housing member 70 for guiding and supporting the aforementioned feed lines 24a and 24b to the motor proper, and for providing a journal for mounting the associated end of the motorized drive pulley unit on the conveyor frame 12.

Figure 3:
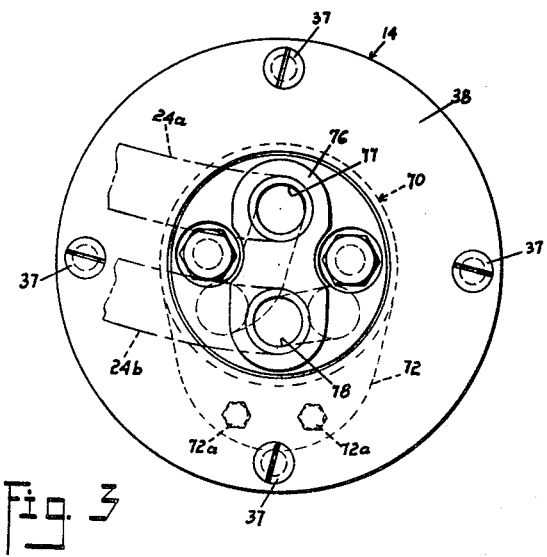
Fig. 3 is an end elevational view taken substantially from the right hand side of Fig. 2, and illustrating in dot-dash lines the feed lines which supply pressurized fluid to the hydraulic motor unit of the motorized pulley.

Adaptor member 70 comprises an inner end flange portion 72 which is suitably secured as by means of bolts 72a (Fig. 3) to the motor unit 24, a stepped-down cylindrical portion 74 providing a journal internally of the housing 20 and which in conjunction with bearing mechanism 74a of conventional type, rotatably mounts in anti-friction relation the housing 20 of the pulley unit on the conveyor frame 12, and an outer end portion 76 which has openings 77 and 78 extending therethrough for connection to the aforementioned feed lines 24a and 24b respectively. Portion 76 is suitably mounted in secured relation on the associated section of the conveyor frame 12 for supporting the corresponding end of the pulley unit on the conveyor frame. Sealing elements of conventional type are preferably provided in conjunction with bearings 74a to prevent lubricant from seeping out of the associated end of the pulley unit. The interior of housing member 20 is preferably supplied with suitable lubricant, such as oil, for lubricating the gear reduction mechanism 22 and the internal bearing components of the pulley unit. In operation, the oil may cling in cylindrical form to the inside of the pulley housing and air may be readily vented through the aforementioned passageway 40a in stub shaft 40 without loss of oil. The passageway 40a may also be conveniently used to supply lubricant to the interior of the pulley unit. In this connection it will be seen that spider member 52 of the gear reduction unit 22 is provided with an axially extending passageway 80 extending therethrough for facilitating the passage of oil from duct 40a into the interior of housing 20. If it is deemed desirable to increase the capacity of the housing section 32 for lubricant, the hydraulic motor unit 24 may be rotated so that the greater portion of the bulk of the motor is disposed above the axial centerline of the pulley unit, rather than below as illustrated, to thus increase the working volume of housing section 32 below the level of passageway 40a.

It will be seen that the motor unit 24 and associated gear reduction mechanism 22 and pulley bearing mechanism (i.e. 51, 67, 74a) are readily accessible for inspection or repair by merely removing fasteners 37 and 32a and associated members 38 and 32, thereby exposing the complete driving mechanism of the pulley. The operating parts and mechanism of the pulley are completely enclosed within the pulley housing, thus protecting the same from weather, damage, loss of lubricant, etc. Maintenance on such a unit is low since such expensive upkeep items as chains and the like are completely eliminated. In the environmental setting of excavating machines, for which the drive pulley is particularly well adapted for use, it will be seen that the operative parts of the mechanism are effectively protected from dirt, spoil and the like in a highly improved arrangement as compared to chain-sprocket drives heretofore used. The instant arrangement also provides much greater safety for the machine operator since the moving parts of the conveyor driving mechanism are enclosed within the pulley housing. The pulley unit is relatively uncomplicated, is compact in design and rugged in construction, and is comparatively economical in cost, thereby greatly increasing the desirability and usability of the unit, and adapting the same for use in a wide range of installations, and especially with various kinds of excavating or trenching machine assemblies. Furthermore, the hydraulic powered pulley unit provides for expeditious speed and direction control of the associated conveyor mechanism, by controlling the volume and direction of the pressurized fluid supplied to the hydraulic motor, and in an uncomplicated yet effective manner not heretofore possible with prior art devices.

From the foregoing discussion and accompanying drawings it will be sen that the invention provides a compact, motorized drive pulley for driving a belt type of conveyor mechanism and one which is particularly well adapted for use with excavating or trenching apparatus. The invention also provides a self-contained drive pulley of the latter type wherein the driving parts of the mechanism are disposed interiorly of the pulley proper, such mechanism including a hydraulic motor unit operably connected to a gear reduction unit for driving the pulley.

The terms and expressions which have been used are used as terms of description and not of limitation and there is no intention in the use of such terms and expressions of excluding any of the features described or portions thereof, but it is recognized that various modifications are possible within the scope of the invention claimed.

We claim:
1. In a belt conveyor for an excavating machine, a motorized drive pulley unit, said unit comprising a closed cylindrical shell portion, a stub shaft extending axially from one end of said shell portion and being secured thereto for journaling said one end of said unit onto associated framework of said conveyor, a rotary hydraulic motor unit disposed interiorly of said shell portion, means connected to said motor unit and extending exteriorly of said shell portion from the other end thereof for mounting said motor unit in stationary relation on the associated framework of said conveyor, means disposed interiorly of said shell portion and on said last-mentioned means for journaling said other end of said pulley unit for anti-frictional rotation with respect to said motor unit, and a gear reduction unit disposed interiorly of said shell portion and being operatively connected to said motor unit and to said shell portion for transmitting power from said motor unit to said shell portion for causing rotation thereof, said gear reduction unit comprising a sun gear coupled to the output shaft of said motor unit, an internal toothed ring gear fixed to said shell portion, and spaced planetary-like gears disposed in meshing relation with said sun and ring gears, said planetary-like gears being rotatably supported between carrier structure which is supportedly secured at one side thereof to the housing of said motor unit and on the other side thereof is supported by bearing means carried by said shell portion for anti-frictional rotation of said shell portion with respect to said carrier structure.

2. In a belt type conveyor in accordance with claim 1, wherein said shell portion comprises a central sheave member having an external circumferentially extending groove therein and spaced hollow cylindrical end sections, at least one of which is detachably connected to said sheave member, said motor unit and said gear reduction unit being disposed in said detachable one of said cylindrical end sections and being readily accessible upon disassembly of said detachable end section from said sheave member, said sheave member including means for mounting said bearing means thereon.

3. A motorized drive pulley in accordance with claim 1 wherein said shaft includes an axially disposed opening extending completely therethrough and providing access to the interior of said shell member from the exterior thereof, said opening providing for venting of said pulley unit during operation thereof and also providing for supplying of lubricant to the interior of said shell portion for lubrication of said gear reduction unit and said bearing and journaling means.

4. A motorized drive pulley for a belt type conveyor, for use on an excavating machine, said pulley comprising a closed shell member of generally cylindrical form and including end wall portions, said shell member comprising a plurality of sections detachably secured together for providing ready access to the interior of said shell member, a reduction gear unit disposed interiorly of said shell member and being operatively coupled to the latter, said gear unit comprising an internal ring gear secured to the interior periphery of said shell member and a sun gear rotatably mounted on an axis disposed in aligned relation to the axis of rotation of said pulley, and a pair of spaced intermediate gear elements meshing with said ring and sun gears and rotatably mounted on fixed axle members, said axle members being mounted by lengthwise spaced support elements including a spider element and a plate element, bearing means disposed between said spider element and said shell member for anti-friction rotation of the latter with respect to said gear unit, fastening means connecting said plate element to said spider element, a rotatable hydraulic motor unit disposed interiorly of said shell member and having a power transmitting shaft secured to said sun gear for driving the latter, said plate element being secured to a confronting end of the housing of said motor unit for supporting the same, and means extending exteriorly from opposite ends of said shell member for mounting said pulley on the framework of the associated conveyor, said last-mentioned means comprising a stub shaft secured to said shell member and having a journal surface thereon disposed exteriorly of one end of said shell member and an adaptor member detachably secured to said motor unit and extending exteriorly of said shell member from the opposite end thereof, said adaptor member having a journal surface thereon disposed interiorly of said shell member, and bearing means disposed intermediate said last-mentioned journal surface and a confronting surface of said shell member for anti-friction rotation of said shell member with respect to said adaptor member and said motor unit.

5. A motorized drive pulley in accordance with claim 4 wherein said adaptor member comprises passageways extending generally longitudinally therethrough and adapted for connection to a source of pressurized fluid for furnishing drive fluid to said motor unit.

References Cited in the file of this patent

UNITED STATES PATENTS

| | | |
|---|---|---|
| 1,313,537 | Jones | Aug. 19, 1919 |
| 1,875,600 | Hele-Shaw et al. | Sept. 6, 1932 |
| 2,354,387 | Lawler | July 25, 1944 |
| 2,375,065 | Askue | May 1, 1945 |
| 2,852,130 | Wallace | Sept. 16, 1958 |

FOREIGN PATENTS

| | | |
|---|---|---|
| 499,227 | Germany | June 4, 1930 |